United States Patent
Ito et al.

(10) Patent No.: US 10,840,020 B2
(45) Date of Patent: Nov. 17, 2020

(54) ELECTRONIC DEVICE

(71) Applicant: TDK CORPORATION, Tokyo (JP)

(72) Inventors: Shinya Ito, Tokyo (JP); Norihisa Ando, Tokyo (JP); Yoshiki Satou, Tokyo (JP); Kosuke Yazawa, Tokyo (JP)

(73) Assignee: TDK CORPORATION, Tokyo (JP)

(*) Notice: Subject to any disclaimer, the term of this patent is extended or adjusted under 35 U.S.C. 154(b) by 0 days.

(21) Appl. No.: 16/556,735

(22) Filed: Aug. 30, 2019

(65) Prior Publication Data
US 2020/0098521 A1  Mar. 26, 2020

(30) Foreign Application Priority Data

Sep. 26, 2018 (JP) ................. 2018-180403

(51) Int. Cl.
*H01G 4/224* (2006.01)
*H01G 4/232* (2006.01)
*H01G 4/236* (2006.01)
*H01G 2/10* (2006.01)
*H01G 4/38* (2006.01)
*H01G 4/30* (2006.01)

(52) U.S. Cl.
CPC ............. *H01G 4/224* (2013.01); *H01G 2/106* (2013.01); *H01G 4/232* (2013.01); *H01G 4/236* (2013.01); *H01G 4/38* (2013.01); *H01G 4/30* (2013.01)

(58) Field of Classification Search
CPC ........ H01G 4/224; H01G 4/232; H01G 4/236; H01G 2/106; H01G 4/38
USPC .................................................. 361/328–329
See application file for complete search history.

(56) References Cited

U.S. PATENT DOCUMENTS

| 5,548,473 A * | 8/1996 | Wang ................ H01G 4/224 |
| | | 361/301.1 |
| 2017/0358397 A1* | 12/2017 | McConnell ........ B23K 35/0227 |
| 2018/0182553 A1* | 6/2018 | Yazawa .................. H01G 4/38 |
| 2019/0304692 A1* | 10/2019 | Ando ..................... H01G 4/248 |

FOREIGN PATENT DOCUMENTS

| JP | 2001-185446 A | 7/2001 | |
| JP | 2011040683 A * | 2/2011 | .............. H01G 4/30 |

* cited by examiner

*Primary Examiner* — Eric W Thomas
(74) *Attorney, Agent, or Firm* — Oliff PLC

(57) ABSTRACT

An electronic device includes at least two chip components, a hold member with insulation, a first conductive terminal piece, a second conductive terminal piece, and an intermediate connection piece. The hold member holds the chip components side by side. The intermediate connection piece connects the terminal electrode of one of the chip components and the terminal electrode of the other chip component.

20 Claims, 6 Drawing Sheets

ELECTRONIC DEVICE

BACKGROUND OF THE INVENTION

The present invention relates to, for example, an electronic device with a metal terminal.

In addition to a normal chip component that is solely directly mounted on a board, as shown in Patent Document 1 for example, a chip component attached with a metal terminal is proposed as an electronic device, such as a ceramic capacitor.

It is reported that the electronic device attached with a metal terminal after being mounted has a reduction effect on a deformation stress that travels from a board to a chip component and a protection effect on a chip component from impacts or so. Thus, the electronic device attached with a metal terminal is used in a field where durability, reliability, and the like are required.

In conventional electronic devices with a metal terminal, however, the terminal electrode of the chip component and the metal terminal are connected by solder, and this connection is a problem. For example, the terminal electrode of the chip component and the metal terminal need to be soldered while being positioned. In particular, when a plurality of chip components is soldered to a pair of metal terminals, this operation is complicated, and the connection may be unreliable. Moreover, when conventional electronic devices with a metal terminal are used in a high-temperature environment, an environment with a large temperature change, or the like, the connection between the chip component and the metal terminal may be released due to, for example, difference in thermal expansion coefficient between the solder and the metal terminal.

In an electronic device where a terminal electrode of a chip component and a metal terminal are connected by a solder, this solder may be melted again by transmission of heat at the mounting of the electronic device to the solder connection part between the terminal electrode and the metal terminal via the metal terminal. Moreover, crack may occur from the solder of the connection part.

Patent Document 1: JP2001185446 (A)

BRIEF SUMMARY OF INVENTION

The present invention has been achieved under such circumstances. It is an object of the invention to provide an electronic device capable of securely and firmly connecting a chip component and a conductive terminal, such as metal terminal, and maintaining a firm electric connection even after mounting.

To achieve the above object, an electronic device according to the present invention includes:

at least two first and second chip components respectively including a pair of terminal electrodes formed on both ends of an element body in a first axis;

a hold member with insulation for holding the at least two first and second chip components side by side in a second axis substantially perpendicular to the first axis;

a first conductive terminal piece including:
  a first connection portion connected with the terminal electrode located near a first end, one end of the first chip component in the first axis; and
  a first mount portion connected with the first connection portion and led to an outside of the hold member;
a second conductive terminal piece including:
  a second connection portion connected with the terminal electrode located near a second end, the other end of the second chip component in the first axis; and
  a second mount portion connected with the second connection portion and led to the outside of the hold member; and
an intermediate connection piece for connecting the terminal electrode located near the second end of the first chip component in the first axis and the terminal electrode located near the first end of the second chip component in the first axis.

In the electronic device according to the present invention, the conductive terminal pieces held by the hold member and the terminal electrodes of the chip components can be connected without solder, and in mounting the electronic device, the solder of the connection parts between the conductive terminal pieces and the chip components is not thereby melted by heat transmitted from the mount portions. Moreover, the chip components and the terminal pieces can be connected under pressure by the hold member, and the chip components and the conductive terminals can be connected securely and firmly.

In the electronic device according to the present invention, the plurality of chip components can be connected in series via the intermediate connection piece without solder by only being attached to the hold member. Moreover, the connection piece or the terminal pieces and the terminal electrodes can be connected without solder by only attaching the plurality of chip components to the hold member. Thus, even if the electronic device according to the present invention is used in a high-temperature environment, an environment with a large temperature change, or the like, the connection parts between the terminal electrodes of the chip components and the connection piece or the terminal pieces absorb differences in thermal expansion and are not released.

Preferably, the hold member is provided with an insulation wall for insulating the terminal electrodes of the first chip component and the terminal electrodes of the second chip component disposed next to the terminal electrodes of the first chip component. When the hold member is provided with the insulation wall, the insulation between the terminal electrodes of the first chip component and the terminal electrodes of the second chip component located next to each other is easily secured. Incidentally, the hold member may further hold other chip components other than the first chip component and the second chip component. In this case, the intermediate connection piece (also the insulation wall as necessary) is disposed between each of three or more chip components.

Preferably, the hold member is provided with a first housing concave for housing the first chip component and a second housing concave for housing the second chip component, and the first housing concave and the second housing concave are divided by the insulation wall.

The chip components can easily be housed in the housing concaves and are connected in series via the intermediate connection piece without solder by only being housed in the housing concaves. Moreover, the terminal electrodes and the connection piece or the terminal pieces can be connected without solder by only attaching the plurality of chip components to the housing concaves. The chip components next to each other are insulated by the insulation wall.

The intermediate connection piece may include an intermediate body going through or straddling the insulation wall. When a slit groove going through the insulation wall is formed, the intermediate body of the intermediate connection piece goes through the slit groove of the insulation wall, and the chip components housed in the housing concaves can be connected in series. Incidentally, the intermediate body of the intermediate connection piece may be disposed to straddle the upper end of the insulation wall. At least a part of the intermediate connection piece may be attached to a lid.

The hold member may include a housing with an upper end opening capable of being closed by a lid. In this case, the chip components are connected in series via the intermediate connection piece without solder by only being housed into the housing via the upper end opening. Moreover, the terminal electrodes and the connection piece or the terminal pieces can be connected without solder by only attaching the plurality of chip components to the housing concaves.

Preferably, the intermediate connection piece includes: a first intermediate connection part folded to be connected with the terminal electrode of the first chip component under pressure by elasticity; and a second intermediate connection part folded to be connected with the terminal electrode of the second chip component under pressure by elasticity.

In this structure, the intermediate connection parts are connected under pressure with the terminal electrodes of the chip components using the elasticity of the intermediate connection parts themselves, and the intermediate connection piece and the terminal electrodes are connected reliably.

The first mount portion and the second mount portion may mutually be located on the other side in the first axis and may be located inside both ends of the hold member in the first axis. This structure achieves downsizing of the electronic device.

The first conductive terminal piece may include a first terminal body connecting the first mount portion and the first connection portion. The second conductive terminal piece may include a second terminal body connecting the second mount portion and the second connection portion. The first terminal body may go through a first slit formed in the hold member. The second terminal body may go through a second slit formed in the hold member. This structure makes it possible to easily attach the terminal pieces to the hold member, to easily lead the mount portions from the hold member, and to easily attach the connection portions of the terminal pieces into the housing concaves.

DETAILED DESCRIPTION OF INVENTION

Hereinafter, the present invention is described based on an embodiment shown in the figures.

Figure 1:
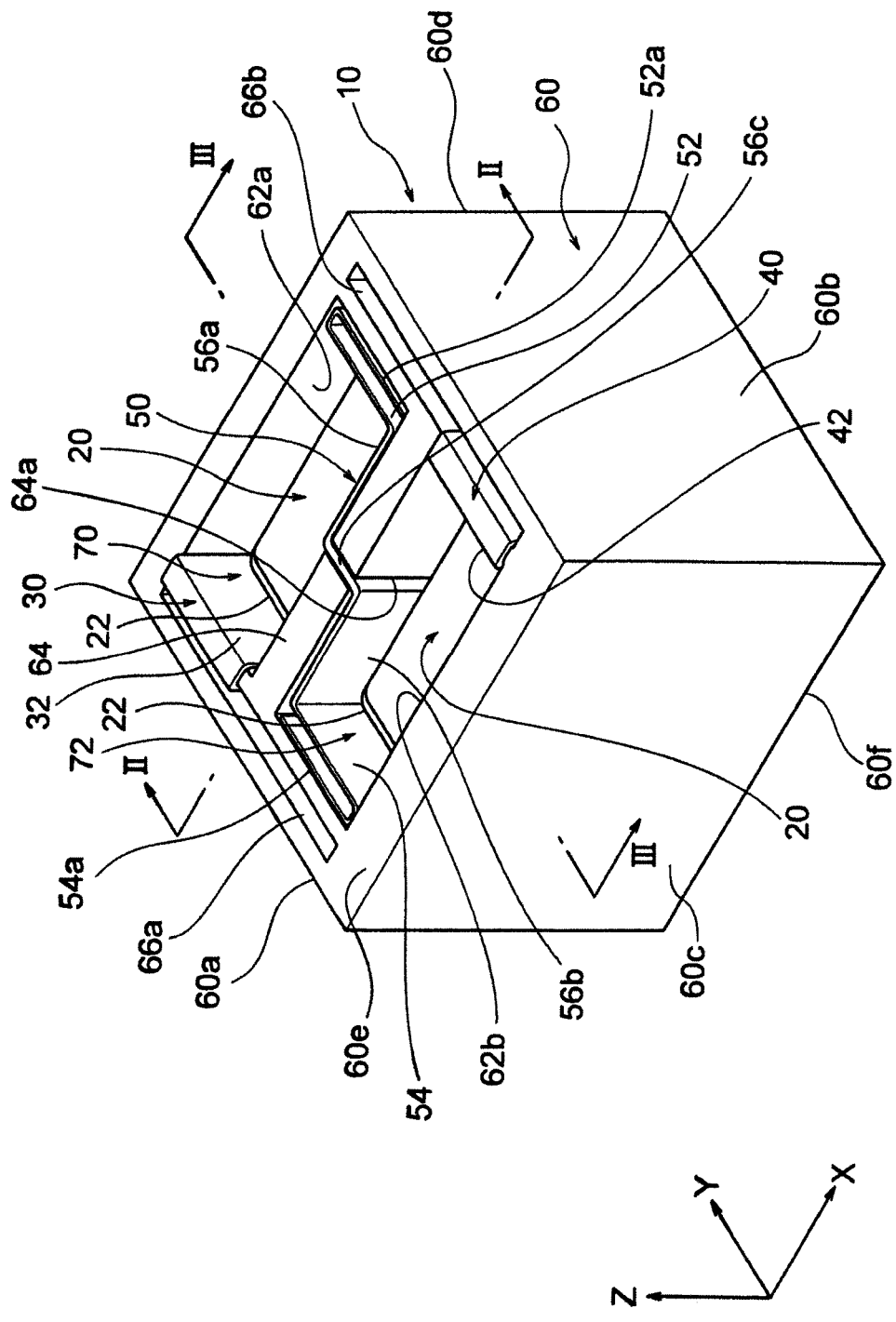
FIG. 1 is a schematic perspective view illustrating a capacitor assembly according to an embodiment of the present invention.

As shown in FIG. 1, a capacitor assembly 10 as an example of the electronic device according to an embodiment of the present invention includes two capacitor chips (first and second chip components) 20, a pair of first and second metal terminals 30 and 40, an intermediate connection piece 50, and a case 60 (hold member). The capacitor assembly 10 according to the present embodiment has two capacitor chips 20, but the capacitor assembly 10 may have three or more capacitor chips 20 (any plural number of capacitor chips 20 is acceptable).

Incidentally, the following explanation for the embodiment is described with a capacitor assembly where the first and second metal terminals (first and second conductive terminal pieces) 30 and 40 are respectively attached to both sides of the two capacitor chips 20 in the X-axis direction, and where the capacitor chips 20 are connected in series by the intermediate connection piece 50, but the electronic device of the present invention is not limited to this capacitor assembly and may be an electronic device where chip components other than capacitors are contained in the case 60.

Figure 4:
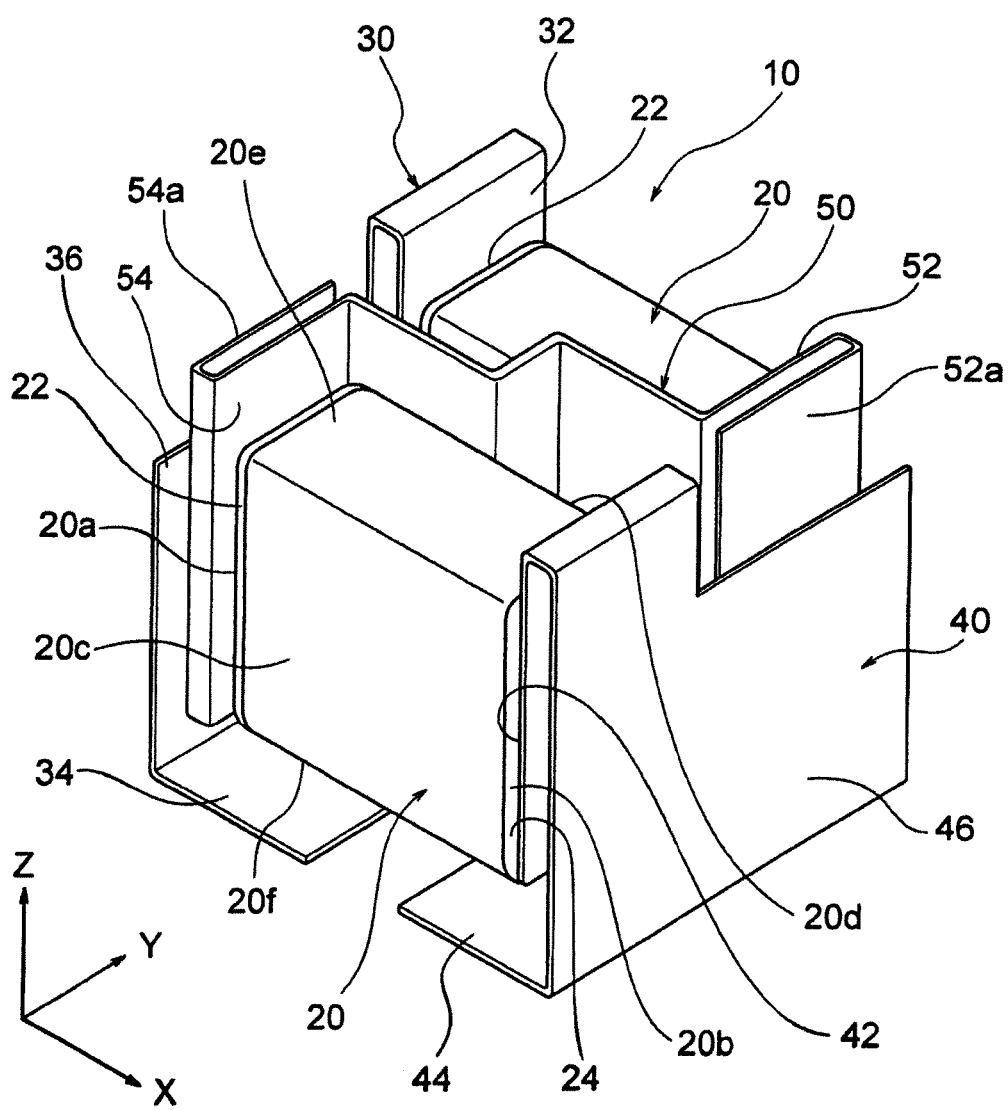
FIG. 4 is a perspective view illustrating a relation between capacitor chips, metal terminals, and an intermediate connection piece shown in FIG. 1.

In the figures, the X-axis (first axis), the Y-axis (second axis), and the Z-axis (third axis) are substantially perpendicular to each other. The Y-axis is parallel to a direction where the capacitor chips 20 are arranged as shown in FIG. 1, the Z-axis corresponds with a height direction of the capacitor assembly 10 from a mount surface, and the X-axis corresponds with a direction where a pair of terminal electrodes 22 and 24 of the chips 20 is mutually arranged on the opposite side as shown in FIG. 4.

The case 60 is made of an insulator (e.g., ceramic, glass, synthetic resin) and is formed by a rectangular parallelepiped housing as a whole. The case 60 has four lateral surfaces 60a to 60d, an upper surface 60e, and a lower surface 60f. The upper surface 60e has two upper end openings 62a and 62b in the Y-axis direction.

Figure 3:
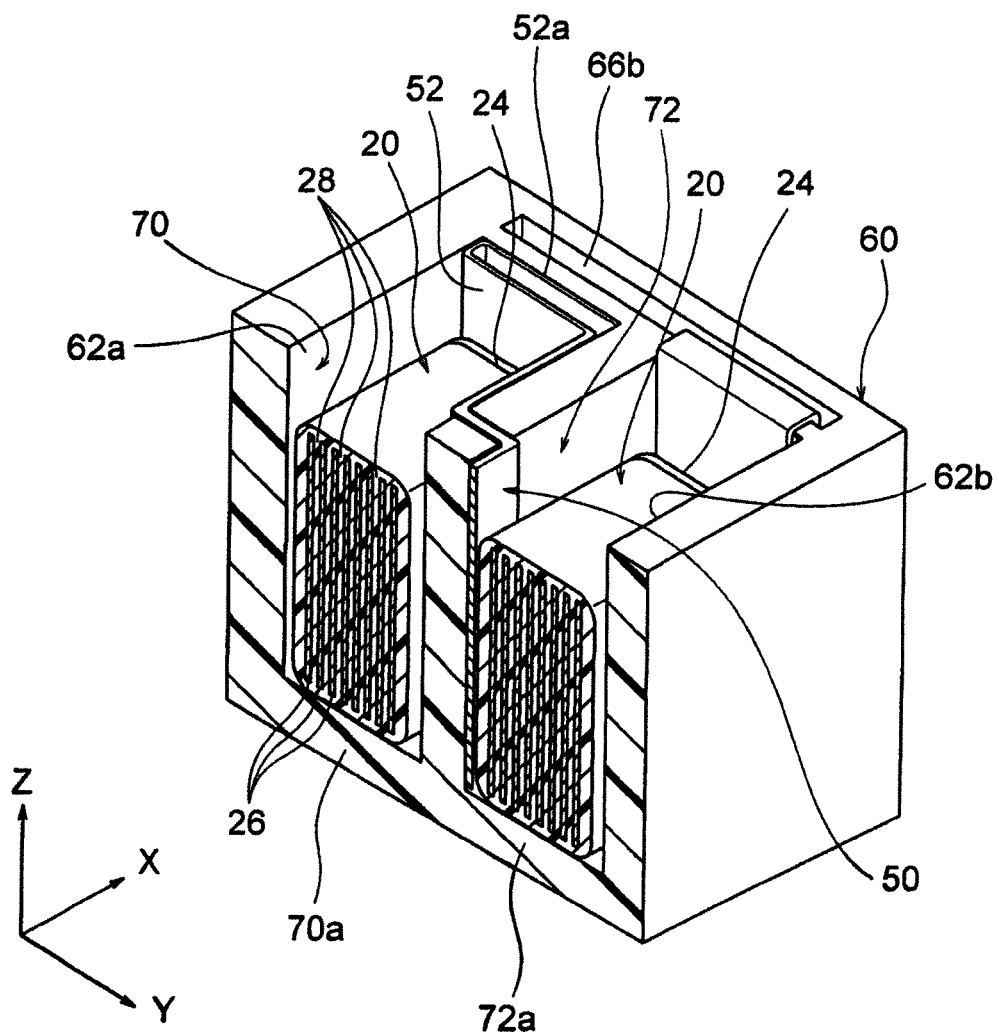
FIG. 3 is a cross-sectional perspective view of the capacitor assembly along the III-III line shown in FIG. 1.

The case 60 has two first and second housing concaves 70 and 72 in the Y-axis direction, and the first and second housing concaves 70 and 72 are divided by an insulation wall 64. The upper part of the housing concave 70 (72) in the Z-axis direction is opened by the upper end opening 62a (62b). As shown in FIG. 3, a bottom wall 70a (72a) is formed at the bottom of the housing concave 70 (72). The capacitor chip 20 (20) contained in the housing concave 70 (72) is installed on the bottom wall 70a (72a).

The width of the housing concave 70 (72) in the Y-axis direction is slightly larger than that of the capacitor chip 20 (20) in the Y-axis direction. The capacitor chip 20 (20) can be inserted from the upper end opening 62a (62b) into the housing concave 70 (72). As shown in FIG. 1, the width of the housing concave 70 (72) in the X-axis direction is larger than that of the capacitor chip 20 (20). The capacitor chip 20 (20) can be inserted from the upper end opening 62a (62b) into the housing concave 70 (72).

In the present embodiment, the depth of the housing concave 70 (72) in the Z-axis direction is equal to or larger than a length of the capacitor chip 20 (20) in the Z-axis direction. A lid (not shown) is easily placed on the upper surface 60e of the case 60. Incidentally, when the lid is not placed on the upper surface 60e of the case 60, the housing concave 70 (72) may have a small depth so that the upper surface of the capacitor chip 20 (20) protrudes from the upper surface 60e of the case 60.

The capacitor chip 20 (20) has an approximately rectangular parallelepiped shape, and the two capacitor chips 20 and 20 have approximately the same shape and size. As shown in FIG. 4, the capacitor chip 20 (20) has a pair of first end surface 20a and second end surface 20b facing each other in the X-axis direction. The first end surface 20a and the second end surface 20b are approximately rectangular.

The capacitor chips 20 are arranged so that the first end surfaces 20a and the second end surfaces 20b are perpendicular to a mount surface incidentally, the mount surface of the capacitor assembly 10 is lower surfaces of first and second mount portions 34 and 44 of the first and second metal terminals 30 and 40 shown in FIG. 4. The mount surface is a surface where the capacitor assembly 10 is attached on a circuit board or so by solder or so and is a parallel surface to the XY plane.

In the capacitor chip 20 (20) shown in FIG. 4, among first to fourth lateral surfaces 20c to 20f (four chip lateral surfaces crossing the first and second end surfaces 20a and 20b), the first and second lateral surfaces 20c and 20d, which have a large area, are arranged perpendicularly to the mount surface, and the third and fourth lateral surfaces 20e and 20f, which have an area that is smaller than an area of the first and second lateral surfaces 20c and 20d, are arranged in parallel to the mount surface. The third lateral surface 20e is an upper lateral surface facing the opposite direction to the mount portions 34 and 44 located below in the Z-axis direction, and the fourth lateral surface 20f is a lower lateral surface facing the mount portions 34 and 44.

The first terminal electrode 22 of the capacitor chip 20 (20) is formed to range from the first end surface 20a to a part of the first to fourth lateral surfaces 20e to 20f. Thus, the first terminal electrode 22 has a part disposed on the first end surface 20a and a part disposed on the first to fourth lateral surfaces 20c and 20f.

The second terminal electrode 24 of the capacitor chip 20 (20) is formed to range from the second end surface 20b to another part of the first to fourth lateral surfaces 20c to 20f (a different part from the part where the first terminal electrode 22 reaches). Thus, the second terminal electrode 24 has a part disposed on the second end surface 20b and a part disposed on the first to fourth lateral surfaces 20c to 20f. The first terminal electrode 22 and the second terminal electrode 24 are arranged with a predetermined distance on the first to fourth lateral surfaces 20c to 20f.

As shown in FIG. 3, which schematically illustrates an internal structure of the capacitor chips 20, the capacitor chips 20 are a multilayer capacitor where internal electrode layers 26 and dielectric layers 28 are laminated. In the internal electrode layers 26 shown in FIG. 4, the internal electrode layers 26 connected with the first terminal electrode 22 (22) and the internal electrode layers 26 connected with the second terminal electrode 24 (24) are laminated alternately by sandwiching the dielectric layers 28.

As shown in FIG. 3, the internal electrode layers 26 of the capacitor chip 20 (20) have a lamination direction that is parallel to the Y-axis and is perpendicular to the X-axis and the Z-axis. That is, the internal electrode layers 26 shown in FIG. 3 are arranged in parallel to the plane of the Z-axis and the X-axis and perpendicularly to the mount surface.

The dielectric layers 28 of the capacitor chip 20 (20) are composed of any dielectric material, such as calcium titanate, strontium titanate, barium titanate, and a mixture thereof. Each of the dielectric layers 28 has any thickness, but normally has a thickness of 1 μm to several hundred μm. In the present embodiment, each of the dielectric layers 28 preferably has a thickness of 1.0 to 5.0 μm. The dielectric layers 28 preferably have a main component of barium titanate, which can increase capacitance of capacitors.

The internal electrode layers 26 contain any conductive material, but may contain a comparatively inexpensive base metal when the dielectric layers 28 are composed of a reduction resistant material. The base metal is preferably Ni or a Ni alloy. The Ni alloy is preferably an alloy of Ni and one or more elements of Mn, Cr, Co, and Al, and preferably contains Ni at 95 wt % or more. Incidentally, Ni or the Ni alloy may contain various fine components, such as P, at about 0.1 wt % or less. The internal electrode layers 26 may be formed using a commercially available electrode paste. Each of the internal electrode layers 26 has a thickness appropriately determined based on usage or so.

The first and second terminal electrodes 22 and 24 shown in FIG. 4 are also composed of any material. The first and second terminal electrodes 22 and 24 are normally composed of copper, copper alloy, nickel, nickel alloy, or the like, but may be composed of silver, an alloy of silver and palladium, or the like. Each of the first and second terminal electrodes 22 and 24 also has any thickness, but normally has a thickness of about 10 to 50 μm. Incidentally, at least one metal film of Ni, Cu, Sn, etc. may be formed on the surfaces of the first and second terminal electrodes 22 and 24.

The capacitor chip 20 (20) has shape and size that are appropriately determined based on object and usage. For example, the capacitor chip 20 (20) has a length (a length in the X-axis shown in FIG. 4) of 1.0 to 6.5 mm, a width (a length in the Z-axis shown in FIG. 4) of 0.5 to 5.5 nm, and a thickness (a length in the Y-axis shown in FIG. 4) of 0.3 to 3.5 mm. When the capacitor assembly 10 has a plurality of capacitor chips 20, the capacitor chips 20 may have mutually different size and shape.

Figure 5:
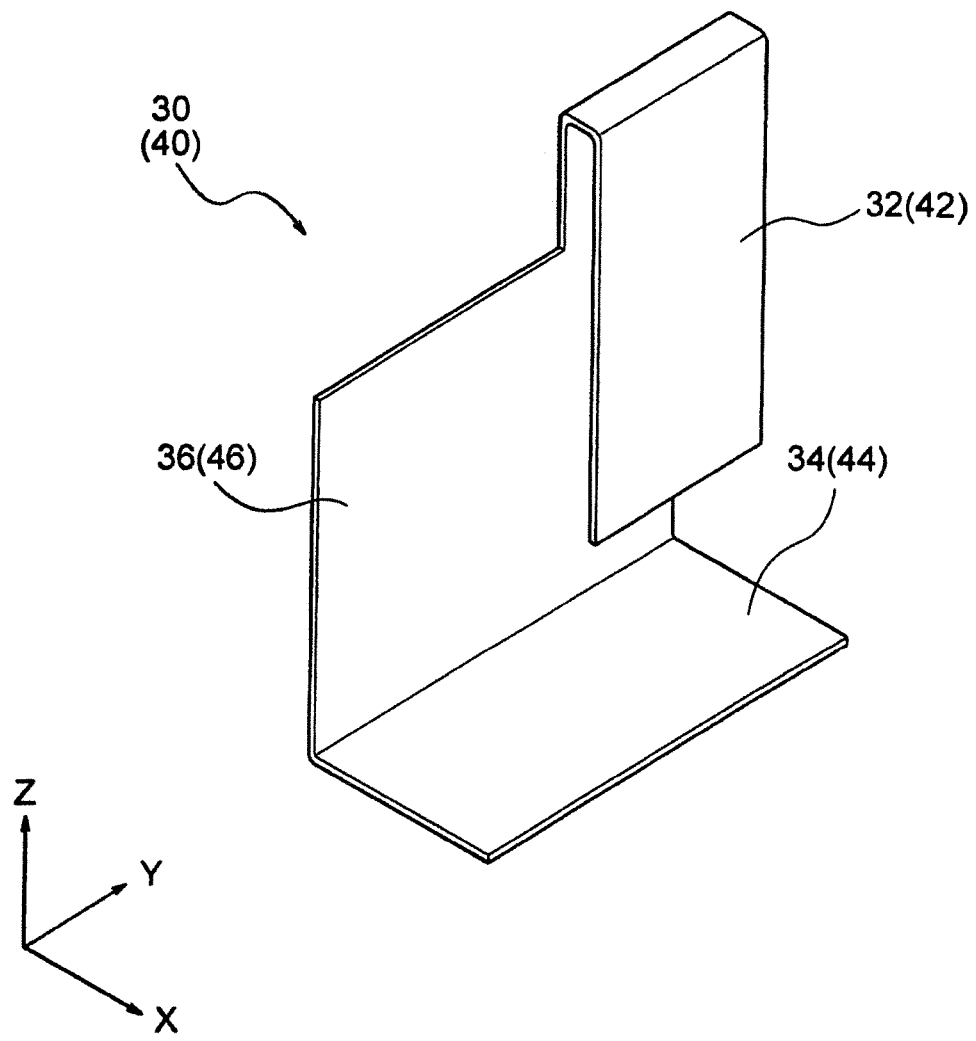
FIG. 5 is a perspective view of the metal terminal shown in FIG. 4.

In the present embodiment, as shown in FIG. 5, the pair of first and second metal terminals 30 and 40 of the capacitor assembly 10 has the same structure and is respectively formed by bending a piece of conductive plate. As shown in FIG. 4, the first metal terminal 30 has a first connection portion 32 electrically connectable by spring force with the terminal electrode 22 formed at one end (first end) in the X-axis direction of either of the capacitor chips 20 next to each other. The width of the first connection portion 32 in the Y-axis direction is slightly larger than the width of the terminal electrode 22 in the Y-axis direction and is slightly smaller than the width of the first housing concave 70 in the Y-axis direction formed in the case 60 shown in FIG. 1. This is because the plate forming the first connection portion 32 can easily enter the first housing concave 70.

Preferably, the length of the first connection portion 32 in the Z-axis direction is equal to or smaller than the depth of the first housing concave 70 in the Z-axis direction and is large enough to contact with the substantially entire surface (at least 50% or more) in the Z-axis direction of the terminal electrode 22 of the capacitor chip 20 shown in FIG. 4. As shown in FIG. 5, the first connection portion 32 is formed by being bent in an inverted U-Shape manner from the back in the Y-axis direction and the upper end in the Z-axis direction of a plate-shaped first terminal body 36 and can be applied with a spring force by being deformed in the X-axis direction with respect to the first terminal body 36.

Preferably, the length of the first terminal body 36 in the Y-axis direction is larger than the width of the first connection portion 32 in the Y-axis direction, is slightly smaller than the width of the case 60 in the Y-axis direction shown in FIG. 1, and is larger than the total of the lengths in the Y-axis direction of all capacitor chips 20 contained in the case 60. The first terminal body 36 shown in FIG. 5 is inserted into a slit 66a going from the upper surface 60e to the lower surface 60f at one end of the case 60 in the X-axis direction. Preferably, the width of the first terminal body 36 in the Y-axis direction is slightly smaller than the width of the slit 66a in the Y-axis direction.

Figure 2:
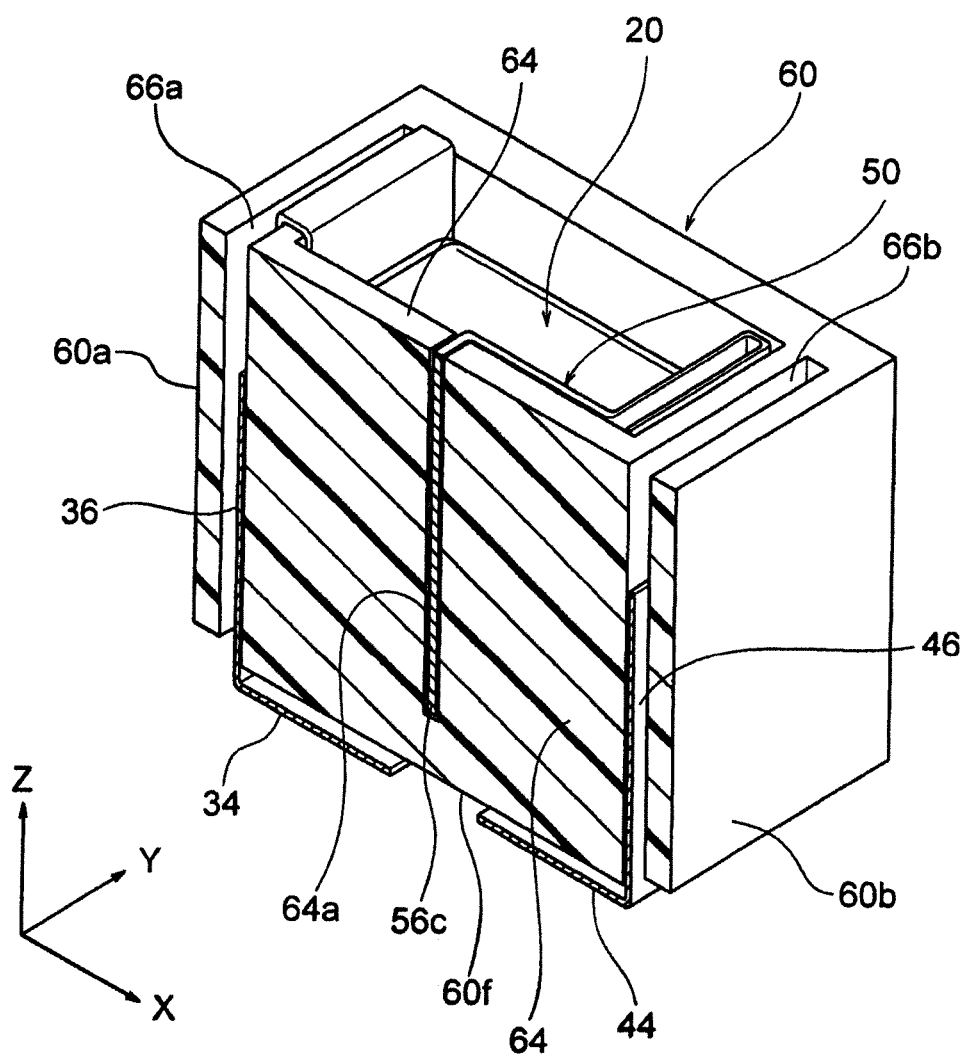
FIG. 2 is a cross-sectional perspective view of the capacitor assembly along the II-II line shown in FIG. 1.

The height of the first terminal body 36 in the Z-axis direction shown in FIG. 5 is preferably large enough to go through the slit 66a shown in FIG. 1 in the Z-axis direction. As shown in FIG. 2, the lower end of the first terminal body 36 in the Z-axis direction protrudes from the lower surface 60f of the case 60. The plate-shaped first mount portion 34 is integrally formed at the lower end of the first terminal body 36 the Z-axis direction while being bent therefrom by about 90 degrees.

The width of the first mount portion 34 in the Y-axis direction is preferably equal to the width of the first terminal body 36 in the Y-axis direction, but may be larger or smaller than the width of the first terminal body 36 in the Y-axis direction. The length of the first mount portion 34 in the X-axis direction is smaller than ½ (preferably, about 3/20 to 8/20) of the length of the case 60 shown in FIG. 2 in the X-axis direction and is determined so that the first mount portion 34 is short-circuited with the second mount portion 44. In the present embodiment, as shown in FIG. 2, the first mount portion 34 and the second mount portion 44 are formed by being bent from the terminal bodies 36 and 46, respectively, so as to face the lower surface 60f of the case 60 with a predetermined space, but at least either of the mount portions 34 and 44 may protrude from the lateral surface 60a or 60b of the case 60. In this case, the mount portion 34 or 44 may have any length in the X-axis direction.

In the present embodiment, the first and second metal terminals 30 and 40 are formed by bending metal plates, and these plates preferably have the same thickness. The metal plates have any thickness, but preferably have a thickness of about 50 to 300 μm.

In the present embodiment, the second metal terminal 40 has the same structure as the first metal terminal 30 as shown in FIG. 4, and the first metal terminal 30 and the second metal terminal 40 are arranged point-symmetrically relative to the center axis of the capacitor assembly 10 in parallel to the Z-axis as shown in FIG. 4.

That is, as shown in FIG. 4, the second metal terminal 40 has a second connection portion 42 electrically connectable by spring force with the terminal electrode 24 formed at the other end (second end) in the X-axis direction of the other capacitor chip 20. The width of the second connection portion 42 in the Y-axis direction is slightly larger than the width of the terminal electrode 24 in the Y-axis direction and is slightly smaller than the width of the second housing concave 72 in the Y-axis direction formed in the case 60 shown in FIG. 1. This is because the plate forming the second connection portion 42 can enter the second housing concave 72.

Preferably, the length of the second connection portion 42 in the Z-axis direction is equal to or smaller than the depth of the second housing concave 72 in the Z-axis direction and is large enough to contact with the substantially entire surface (at least 50% or more) in the Z-axis direction of the terminal electrode 22 of the capacitor chip 20 shown in FIG. 4. As shown in FIG. 5, the second connection portion 42 is formed by being bent in an inverted U-shape manner from the back in the Y-axis direction and the upper end in the Z-axis direction of the plate-shaped second terminal body 46 and can be applied with a spring force by being deformed in the X-axis direction with respect to the second terminal body 46.

The width of the second terminal body 46 in the Y-axis direction is equal to the width of the first terminal body 36 in the Y-axis direction. The second terminal body 46 is inserted into a slit 66b going from the upper surface 60e to the lower surface 60f at the other end of the case 60 in the X-axis direction. Preferably, the width of the second terminal body 46 in the Y-axis direction is slightly smaller than the width of the slit 66b in the Y-axis direction.

The height in the Z-axis direction of the second terminal body 46 shown in FIG. 5 is preferably large enough to go through the slit 66b shown in FIG. 1 in the Z-axis direction. As shown in FIG. 2, the lower end of the second terminal body 46 in the Z-axis direction protrudes from the lower surface 60f of the case 60. The plate-shaped second mount portion 44 is integrally formed at the lower end of the second terminal body 46 in the Z-axis direction while being bent therefrom by about 90 degrees.

The width of the second mount portion 44 in the Y-axis direction is preferably equal to the width of the second terminal body 46 in the Y-axis direction, but may be larger or smaller than the width of the second terminal body 46 in the Y-axis direction. The length of the second mount portion 44 in the X-axis direction is determined in a similar manner to that of the first mount portion 34 in the X-axis direction.

Figure 6:
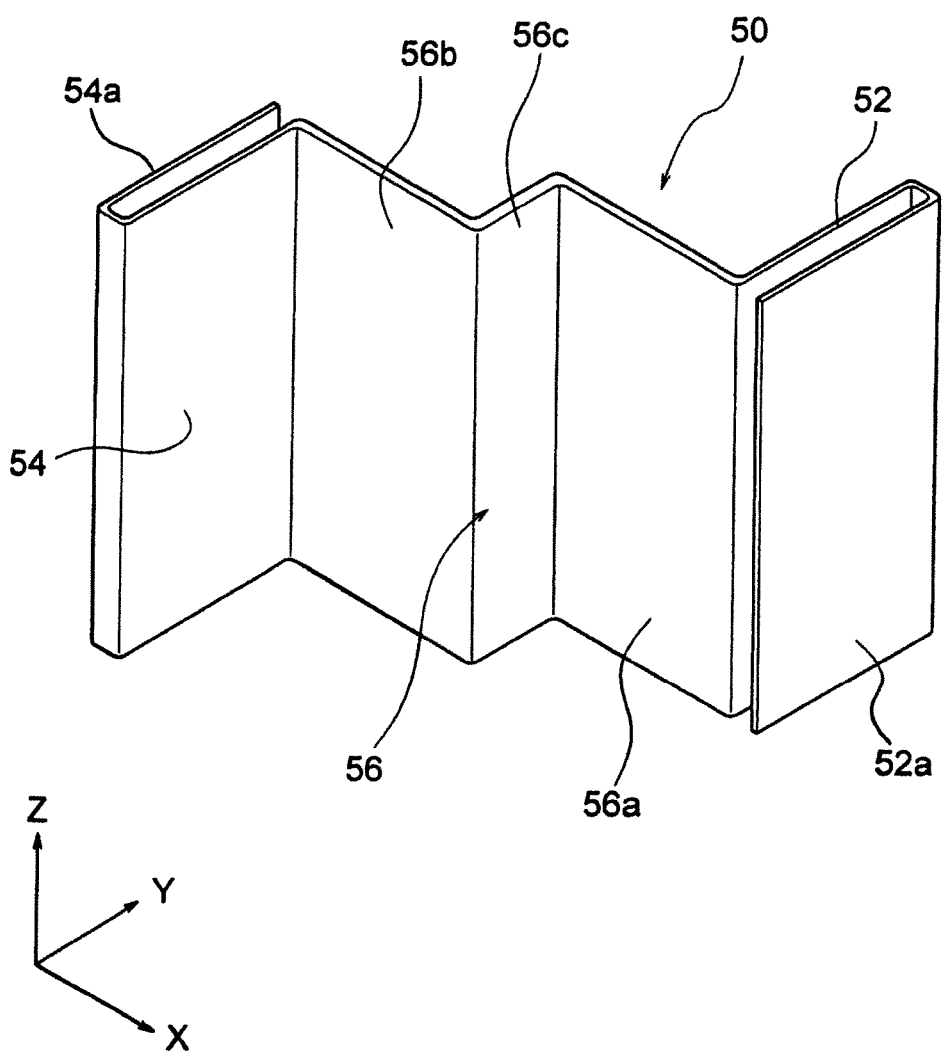
FIG. 6 is a perspective view of the intermediate connection piece shown in FIG. 4.

As shown in FIG. 6, the intermediate connection piece 50 is formed by bending a piece of metallic plate. The intermediate connection piece 50 is as thick as the metal terminal 30 or 40, but is not necessarily as thick as the metal terminal 30 or 40. The intermediate connection piece 50 includes a first intermediate connection part 52, a second intermediate connection part 54, and an intermediate body 56 connecting them. The intermediate body 56 includes a first intermediate body 56a connected with the first intermediate connection part 52 and a second intermediate body 56b connected with the second intermediate connection part 54. The intermediate bodies 56a and 56b are connected by a connection part 56c.

The first intermediate connection part 52 is provided with a first folded piece 52a folded in an approximately U-shaped manner at the end of the first intermediate connection part 52 in the Y-axis direction. In the present embodiment, the length of the first folded piece 52a in the Y-axis direction is approximately the same as the length of the first intermediate connection part 52 in the Y-axis direction, but may be smaller than the length of the first intermediate connection part 52 in the Y-axis direction. Likewise, the second intermediate connection part 54 is provided with a second folded piece 54a folded in an approximately U-shaped manner at the end of the second intermediate connection part 54 in the Y-axis direction. In the present embodiment, the length of the second folded piece 54a in the Y-axis direction is approximately the same as the length of the second intermediate connection part 54 in the Y-axis direction, but may be smaller than the length of the second intermediate connection part 54 in the Y-axis direction. The intermediate connection piece 50 has a uniform height in the Z-axis direction along the longitudinal direction of the intermediate connection piece 50. The height of the intermediate connection piece 50 in the Z-axis direction is equal to the depth of the housing concave 70 (72) shown in FIG. 1.

As shown in FIG. 3 and FIG. 4, the first intermediate connection part 52 of the intermediate connection piece 50 is electrically connected by spring force with the terminal electrode 24 formed at the other end in the X-axis direction of either of the capacitor chips 20 next to each other. For this structure, as shown in FIG. 1, the first intermediate connection part 52 of the intermediate connection piece 50 is contained near the inner wall surface at the other end of the first housing concave 70 in the X-axis direction along with the first folded piece 52a.

The first folded piece 52a of the first intermediate connection part 52 of the intermediate connection piece 50 is contacted with the inner wall surface at the other end of the first housing concave 70 in the X-axis direction. The first intermediate connection part 52 is connected under pressure with the second terminal electrode 24 of the capacitor chip 20 (see FIG. 3). The spring force of the first folded piece 52*a* presses the chip 20 against one end in the X-axis direction and connects the first terminal electrode 22 with the first connection portion 32 of the first metal terminal 30.

As shown in FIG. 3 and FIG. 4, the second intermediate connection part 54 of the intermediate connection piece 50 is electrically connected by spring force with the terminal electrode 22 formed at one end in the X-axis direction of the other capacitor chip 20. For this structure, as shown in FIG. 1, the second intermediate connection part 54 of the intermediate connection piece 50 is contained near the inner wall surface at one end of the second housing concave 72 in the X-axis direction along with the second folded piece 54*a*.

The second folded piece 54*a* of the second intermediate connection part 54 of the intermediate connection piece 50 is contacted with the inner wall surface at one end of the second housing concave 72 in the X-axis direction. The second intermediate connection part 54 is connected under pressure with the first terminal electrode 22 of the capacitor chip 20. The spring force of the second folded piece 54*a* presses the chip 20 against the other end in the X-axis direction and connects the second terminal electrode 24 with the second connection portion 42 of the second metal terminal 40.

As shown in FIG. 1, the first intermediate body 56*a* of the intermediate connection piece 50 is closely attached on the inner surface of the insulation wall 64 in the first housing concave 70, the second intermediate body 561 of the intermediate connection piece 50 is closely attached on the inner surface of the insulation wall 64 in the second housing concave 72, and the connection part 56*c* is inserted into a slit groove 64*a* formed along the Z-axis direction in the middle (preferably, substantially central part) of the insulation wall 64 in the X-axis direction. The slit groove 64*a* connects the first housing concave 70 and the second housing concave 72 and is as deep as the first and second housing concaves 70 and 72. The capacitor chips 20 are respectively inserted from the upper end openings 62*a* and 62*b* of the first housing concave 70 and the second housing concave 72 while the first metal terminal 30, the second metal terminal 40, and the intermediate connection piece 50 are being attached to the case 60 in the above-mentioned manner.

As a result, either of the capacitor chips 20 is pressed by a spring force of the first folded piece 52*a* and is sandwiched between the first connection portion 32 of the first metal terminal 30 and the first intermediate connection part 52 of the intermediate connection piece 50 in the first housing concave 70. In this state, the first terminal electrode 22 of the capacitor chip 20 is pressed and connected with the first connection portion 32 and the second terminal electrode 24 is pressed and connected with the first intermediate connection part 52. Incidentally, the first connection portion 32 itself may also be applied with a spring force and may be connected under pressure with the first terminal electrode 22 of the chip 20 by adjusting the bending angle of the first connection portion 32 of the first metal terminal 30, the distance to the first terminal body 36, or the like.

The other capacitor chip 20 is pressed by a spring force of the second folded piece 54*a* and is sandwiched between the second connection portion 42 of the second metal terminal 40 and the second intermediate connection part 54 of the intermediate connection piece 50 in the second housing concave 72. In this state, the first terminal electrode 22 of the capacitor chip 20 is pressed and connected with the second intermediate connection part 54, and the second terminal electrode 24 is pressed and connected with the second intermediate connection part 54. Incidentally, the second connection portion 42 itself may also be applied with a spring force and may be connected under pressure with the second terminal electrode 24 of the chip 20 by adjusting the bending angle of the second connection portion 42 of the second metal terminal 40, the distance to the second terminal body 46, or the like.

Hereinafter, a method of manufacturing the capacitor assembly 10 is explained.

In the manufacture of the multilayer capacitor chip 20, a capacitor element body is initially obtained by pressurizing and firing a laminated body prepared by laminating green sheets (to be the dielectric layers 28 after firing) with electrode patterns to be the internal electrode layers 26 after firing. Moreover, the first and second terminal electrodes 22 and 24 are formed on the capacitor element body by baking and plating a terminal electrode paint, and the capacitor chip 20 is thereby obtained.

A paint for green sheets and a paint for internal electrode layers (raw materials of the laminated body), a raw material of the terminal electrodes, firing conditions of the laminated body and the electrodes, and the like are not limited and can be determined with reference to known methods or so. In the present embodiment, ceramic green sheets whose main component is barium titanate are used as a dielectric material. In the terminal electrodes, a Cu paste is immersed and baked to form a baked layer, and a Ni plating treatment and a Sn plating treatment are conducted, whereby Cu baked layer/Ni plating layer/Sn plating layer is formed.

In the manufacture of the first metal terminal 30, a metal plate is initially prepared. The metal plate is composed of any conductive metal material, such as iron, nickel, copper, silver, and an alloy thereof. Next, the metal plate is machined into intermediate members having shapes of the first connection portion 32, the mount portion 34, the first terminal body 36, and the like.

Next, a metal film is formed by plating on the surfaces of the intermediate members formed by the machining, and the first metal terminal 30 is obtained. Any material, such as Ni, Sn, and Cu, is used for the plating. Incidentally, a plurality of first metal terminals 30 may be formed in a mutually connected state from a metal plate continuing in a band manner. The plurality of first metal terminals 30 connected with each other is cut into pieces before or after being connected with the capacitor chips 20. The second metal terminal 40 and the intermediate connection piece 50 are manufactured in a similar manner to the first metal terminal 30.

The first metal terminal 30, the second metal terminal 40, and the intermediate connection piece 50 obtained in the above-mentioned manner are attached to the case 60. The first metal terminal 30 is attached to the case 60 so that the first terminal body 36 shown in FIG. 5 is inserted into the slit 66*a* shown in FIG. 1, and so that the first connection portion 32 is inserted into one end of the first housing concave 70. In the attachment to the case 60, the mount portion 34 shown in FIG. 5 is on the same plane as the first terminal body 36, and the first mount portion 34 and the first terminal body 36 can collectively be inserted into the slit 66*a* shown in FIG. 1. The first mount portion 34 protrudes downward from the lower surface 60*f* of the case 60 in the Z-axis direction via the slit 66*a* and is thereafter bent substantially perpendicularly to the first terminal body 36 and disposed with a predetermined space under the lower surface 60f of the case 60 as shown in FIG. 2.

As with the first metal terminal 30, the second metal terminal 40 is attached to the case 60 so that the second terminal body 46 shown in FIG. 5 is inserted into the slit 66b shown in FIG. 1, and so that the second connection portion 42 is inserted into the other end of the second housing concave 72, in the attachment to the case 60, the mount portion 44 shown in FIG. 5 is on the same plane as the second terminal body 46, and the mount portion 44 and the second terminal body 46 can collectively be inserted into the slit 66b shown in FIG. 1. The second mount portion 44 protrudes downward from the lower surface 60f of the case 60 in the Z-axis direction via the slit 66b and is thereafter bent substantially perpendicularly to the second terminal body 46 and disposed with a predetermined space under the lower surface 60f of the case 60 as shown in FIG. 2. The tip of the first mount portion 34 in the X-axis direction and the tip of the second mount portion 44 in the X-axis direction are arranged with a predetermined space and are insulated.

After or before the first metal terminal 30 and the second metal terminal 40 are attached to the case 60, the intermediate connection piece 50 is attached to the case 60. The intermediate connection piece 50 is bent in advance as shown in FIG. 6 and is attached to the case 60 as shown in FIG. 1. That is, the first intermediate body 56a of the intermediate connection piece 50 is closely attached on the inner surface of the insulation wall 64 in the first housing concave 70, the second intermediate body 56b of the intermediate connection piece 50 is closely attached on the inner surface of the insulation wall 64 in the second housing concave 70, and the connection part 56c is inserted into the slit groove 64a. The capacitor chips 20 are respectively inserted into the first housing concave 70 and the second housing concave 72 from the upper end openings 62a and 62b while the first metal terminal 30, the second metal terminal 40, and the intermediate connection piece 50 are being attached to the case 60 in the above-mentioned manner.

In the capacitor assembly 10 obtained as described above, the metal terminals 30 and 40 and the intermediate connection piece 50 attached to the case 60 (hold member) and the terminal electrodes 22 and 24 of the chips 20 can be connected without solder. In mounting the capacitor assembly 10, the solder of the connection parts between the metal terminals 30 and 40 and the terminal electrodes 22 and 24 of the chips 20 is not thereby melted by heat transmitted from the mount portions 34 and 44. Moreover, the chips 20 and the metal terminals 30 and 40 (including the intermediate connection piece 50) can be connected under pressure in the first and second housing concaves 70 and 72 of the case 60 and can be connected securely and firmly.

In the capacitor assembly 10 according to the present embodiment, the plurality of chips 20 is connected in series via the intermediate connection piece 50 without solder by only being attached to the case 60. Moreover, the intermediate connection piece 50 or the metal terminals 30 and 40 and the terminal electrodes 22 and 24 can be connected without solder by only attaching the plurality of chips 20 to the case 60. Thus, even if the capacitor assembly 10 according to the present embodiment is used in a high-temperature environment, an environment with a large temperature change, or the like, the connection parts between the terminal electrodes 22 and 24 of the chips 20 and the connection piece 50 or the metal terminals 30 and 40 absorb differences in thermal expansion and are not released.

Moreover, the ease 60 includes the insulation wall 64 insulating the terminal electrodes 22 and 24 of either of the capacitor chips 20 and the terminal electrodes 22 and 24 of the other capacitor chip 20 disposed next to the terminal electrodes 22 and 24 of the former capacitor chip 20. Since the case 60 includes the insulation wall 64, the terminal electrodes 22 and 24 of the chips 20 next to each other are easily insulated.

Moreover, the case 60 includes the first and second housing concaves 70 and 72, and the first and second housing concaves 70 and 72 are divided by the insulation wall 64. The chips 20 are easily housed in the first and second housing concaves 70 and 72, respectively, and are connected in series via the intermediate connection piece 50 without solder by only being housed in the first and second housing concaves 70 and 72. Moreover, the terminal electrodes 22 and 24 and the connection piece 50 or the terminals 30 and 40 can be connected without solder by only attaching the plurality of chips 20 to the first and second housing concaves 70 and 72. The chips 20 next to each other are insulated by the insulation wall 64.

The intermediate connection piece 50 includes the intermediate body 56 going through or straddling the insulation wall 64. Since the slit groove 64a is formed in the middle of the insulation wall 64, the connection part 56c of the intermediate body 56 of the intermediate connection piece 50 goes through the slit groove 64a of the insulation wall 64, and the chips 20 housed in the first and second housing concaves 70 and 72 can be connected in series.

In the present embodiment, the case 60 includes the upper end openings 62a and 62b, and the upper end openings 62a and 62b can be closed by a lid. Thus, the chips 20 are connected in series via the intermediate connection piece 50 without solder by only being housed into the case 60 via the upper end openings 62a and 62b. Moreover, the terminal electrodes 22 and 24 and the connection piece 50 or the terminals 30 and 40 can be connected without solder by only attaching the plurality of chips 20 to the first and second housing concaves 70 and 72.

In the present embodiment, the intermediate connection parts 52 and 54 of the intermediate connection piece 50 are connected under pressure with the terminal electrodes 22 and 24 of the chips 20 using the elasticity of the intermediate connection parts 52 and 54 themselves, and the intermediate connection piece 50 and the terminal electrodes 22 and 24 are connected reliably. Moreover, the connection portions 32 and 42 of the metal terminals 30 and 40 may be elastic.

In the present embodiment, the terminal body 36 (46) of the metal terminal 30 (40) goes through the slit 66a (66b) formed in the case 60. Thus, the terminals 30 and 40 can easily be attached to the case 60, and the mount portions 34 and 44 are easily led from the ease 60. Moreover, the connection portions of the terminals 30 and 40 are easily attached inside the first and second housing concaves 70 and 72.

Moreover, as shown in FIG. 4, the height direction (Z-axis direction) of the capacitor assembly 10 is substantially parallel to the first and second lateral surfaces 20c and 20d of the capacitor chips 20, and the mount portions 34 and 44 are formed by being bent under the capacitor chips 20. Thus, the capacitor assembly 10 has a small projected area in the height direction (Z-axis direction) and can thereby be mounted with a small mounting area.

Since the plurality of capacitor chips 20 is arranged in parallel to the mount surface and has a parallel lamination direction to the mount surface, the capacitor assembly 10 can have a low ESL.

Incidentally, the present invention is not limited to the above-mentioned embodiment and can variously be changed within the scope of the present invention.

In the present invention, for example, the electronic device may include two or more chips. For example, when three or more capacitor chips 20 are housed in the case 60, the case 60 has a large length in the Y-axis direction, and the intermediate connection piece 50 (also the insulation wall 64 as necessary) is disposed between each of the three or more chips 20.

In the above-mentioned embodiment, the connection part 56c of the intermediate body 56 of the intermediate connection piece 50 goes through the slit groove 64a of the insulation wall 64 and connects the chips 20 in series housed in the housing concaves 70 and 72, but the intermediate body of the intermediate connection piece may be disposed to straddle the upper end of the insulation wall. Moreover, at least a part of the intermediate connection piece 50 may be attached to a lid (not shown).

Moreover, the hold member of the present invention does not necessarily have a housing structure like the case 60 and may have any structure that can hold the intermediate connection piece 50, the metal terminals 30 and 40, and a plurality of chips 20.

DESCRIPTION OF THE REFERENCE NUMERICAL

10 . . . capacitor assembly
20 . . . capacitor chip
20a . . . first end surface
20b . . . second end surface
20c . . . first lateral surface
20d . . . second lateral surface
20e . . . third lateral surface
20f . . . fourth lateral surface
22 . . . first terminal electrode
24 . . . second terminal electrode
26 . . . internal electrode layer
28 . . . dielectric layer
30 . . . first metal terminal (first conductive terminal piece)
32 . . . first connection portion
34 . . . first mount portion
36 . . . first terminal body
40 . . . second metal terminal (second conductive terminal piece)
42 . . . second connection portion
44 . . . second mount portion
46 . . . second terminal body
50 . . . intermediate connection piece
52 . . . first intermediate connection part
52a . . . first folded piece
54 . . . second intermediate mount portion
54a . . . second folded piece
56 . . . intermediate body
56a . . . first intermediate body
56b . . . second intermediate body
56c . . . connection part
60 . . . case (housing/hold member)
60a-60d . . . lateral surface
60c . . . upper surface
60e . . . lower surface
62a, 62b . . . upper end opening
64 . . . insulation wall
64a . . . groove
66a, 66b . . . slit
70, 72 . . . housing concave
70a, 72a . . . bottom wall

What is claimed is:

1. An electronic device comprising:
at least two first and second chip components respectively including a pair of terminal electrodes formed on both ends of an element body in a first axis;
a hold member with insulation for holding the at least two first and second chip components side by side in a second axis substantially perpendicular to the first axis;
a first conductive terminal piece including:
a first connection portion connected with the terminal electrode located near a first end, one end of the first chip component in the first axis; and
a first mount portion connected with the first connection portion and led to an outside of the hold member;
a second conductive terminal piece including:
a second connection portion connected with the terminal electrode located near a second end, the other end of the second chip component in the first axis; and
a second mount portion connected with the second connection portion and led to the outside of the hold member; and
an intermediate connection piece for connecting the terminal electrode located near the second end of the first chip component in the first axis and the terminal electrode located near the first end of the second chip component in the first axis.

2. The electronic device according to claim 1, wherein the hold member is provided with an insulation wall for insulating the terminal electrodes of the first chip component and the terminal electrodes of the second chip component disposed next to the terminal electrodes of the first chip component.

3. The electronic device according to claim 2, wherein
the hold member is provided with a first housing concave for housing the first chip component and a second housing concave for housing the second chip component;
the first housing concave and the second housing concave are divided by the insulation wall; and
the intermediate connection piece includes an intermediate body going through or straddling the insulation wall.

4. The electronic device according to claim 2, wherein the hold member includes a housing with an upper end opening capable of being closed by a lid.

5. The electronic device according to claim 2, wherein the intermediate connection piece includes:
a first intermediate connection part folded to be connected with the terminal electrode of the first chip component under pressure by elasticity; and
a second intermediate connection part folded to be connected with the terminal electrode of the second chip component under pressure by elasticity.

6. The electronic device according to claim 2, wherein the first mount portion and the second mount portion are mutually located on the other side in the first axis and are located inside both ends of the hold member in the first axis.

7. The electronic device according to claim 2, wherein
the first conductive terminal piece includes a first terminal body connecting the first mount portion and the first connection portion,
the second conductive terminal piece includes a second terminal body connecting the second mount portion and the second connection portion, the first terminal body goes through a first slit formed in the hold member, and the second terminal body goes through a second slit formed in the hold member.

8. The electronic device according to claim 3, wherein the hold member includes a housing with an upper end opening capable of being closed by a lid.

9. The electronic device according to claim 3, wherein the intermediate connection piece includes:
- a first intermediate connection part folded to be connected with the terminal electrode of the first chip component under pressure by elasticity; and
- a second intermediate connection part folded to be connected with the terminal electrode of the second chip component under pressure by elasticity.

10. The electronic device according to claim 3, wherein the first mount portion and the second mount portion are mutually located on the other side in the first axis and are located inside both ends of the hold member in the first axis.

11. The electronic device according to claim 3, wherein
- the first conductive terminal piece includes a first terminal body connecting the first mount portion and the first connection portion,
- the second conductive terminal piece includes a second terminal body connecting the second mount portion and the second connection portion,
- the first terminal body goes through a first slit formed in the hold member, and
- the second terminal body goes through a second slit formed in the hold member.

12. The electronic device according to claim 1, wherein the hold member includes a housing with an upper end opening capable of being closed by a lid.

13. The electronic device according to claim 12, wherein the intermediate connection piece includes:
- a first intermediate connection part folded to be connected with the terminal electrode of the first chip component under pressure by elasticity; and
- a second intermediate connection part folded to be connected with the terminal electrode of the second chip component under pressure by elasticity.

14. The electronic device according to claim 12, wherein the first mount portion and the second mount portion are mutually located on the other side in the first axis and are located inside both ends of the hold member in the first axis.

15. The electronic device according to claim 12, wherein
- the first conductive terminal piece includes a first terminal body connecting the first mount portion and the first connection portion,
- the second conductive terminal piece includes a second terminal body connecting the second mount portion and the second connection portion,
- the first terminal body goes through a first slit formed in the hold member, and
- the second terminal body goes through a second slit formed in the hold member.

16. The electronic device according to claim 1, wherein the intermediate connection piece includes:
- a first intermediate connection part folded to be connected with the terminal electrode of the first chip component under pressure by elasticity; and
- a second intermediate connection part folded to be connected with the terminal electrode of the second chip component under pressure by elasticity.

17. The electronic device according to claim 16, wherein the first mount portion and the second mount portion are mutually located on the other side in the first axis and are located inside both ends of the hold member in the first axis.

18. The electronic device according to claim 16, wherein
- the first conductive terminal piece includes a first terminal body connecting the first mount portion and the first connection portion,
- the second conductive terminal piece includes a second terminal body connecting the second mount portion and the second connection portion,
- the first terminal body goes through a first slit formed in the hold member, and
- the second terminal body goes through a second slit formed in the hold member.

19. The electronic device according to claim 1, wherein the first mount portion and the second mount portion are mutually located on the other side in the first axis and are located inside both ends of the hold member in the first axis.

20. The electronic device according to claim 1, wherein
- the first conductive terminal piece includes a first terminal body connecting the first mount portion and the first connection portion,
- the second conductive terminal piece includes a second terminal body connecting the second mount portion and the second connection portion,
- the first terminal body goes through a first slit formed in the hold member, and
- the second terminal body goes through a second slit formed in the hold member.

* * * * *